United States Patent
Geis-Esser et al.

(10) Patent No.: US 11,196,363 B2
(45) Date of Patent: Dec. 7, 2021

(54) ELECTRONICS HAVING ONE OR MORE OUTPUT-STAGE UNITS FOR THE OPERATION OF TWO OR MORE MOTOR UNITS

(71) Applicant: KNORR-BREMSE Systeme fuer Nutzfahrzeuge GmbH, Munich (DE)

(72) Inventors: Daniel Geis-Esser, Munich (DE); Jochen Retter, Holzgerlingen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 16/763,472

(22) PCT Filed: Nov. 8, 2018

(86) PCT No.: PCT/EP2018/080689
§ 371 (c)(1),
(2) Date: May 12, 2020

(87) PCT Pub. No.: WO2019/092151
PCT Pub. Date: May 16, 2019

(65) Prior Publication Data
US 2020/0366221 A1      Nov. 19, 2020

(30) Foreign Application Priority Data
Nov. 13, 2017   (DE) ..................... 10 2017 220 136.3

(51) Int. Cl.
*H02P 6/00*        (2016.01)
*H02P 6/04*        (2016.01)
*H02P 25/03*       (2016.01)

(52) U.S. Cl.
CPC ................ *H02P 6/04* (2013.01); *H02P 25/03* (2016.02)

(58) Field of Classification Search
CPC .... H02P 6/04; H02P 25/03; H02P 5/68; H02P 1/54; H02P 5/74; H02P 2101/45; G05B 19/4144
See application file for complete search history.

(56) References Cited

U.S. PATENT DOCUMENTS

| 5,490,056 A | 2/1996 | Iwasaki |
| 2004/0207345 A1 | 10/2004 | Kalender |

(Continued)

FOREIGN PATENT DOCUMENTS

| DE | 43 10 958 A1 | 10/1993 |
| DE | 199 41 474 A1 | 3/2001 |

(Continued)

OTHER PUBLICATIONS

International Preliminary Report on Patentability (PCT/IB/326 & PCT/IB/373) issued in PCT Application No. PCT/EP2018/080689 dated May 28, 2020 including English translation of document C2 (Japanese-language Written Opinion (PCT/ISA/237) previously filed on May 12, 2020) (six (6) pages).

(Continued)

*Primary Examiner* — Karen Masih
(74) *Attorney, Agent, or Firm* — Crowell & Moring LLP

(57) ABSTRACT

An apparatus controls a system of a plurality of motor units, which are operated by way of output-stage units. Fewer output-stage units than motor units are provided. The apparatus has a switching unit, which is configured to switch the one or more output-stage units between the motor units.

6 Claims, 1 Drawing Sheet

(56) References Cited

U.S. PATENT DOCUMENTS

2009/0289593 A1* 11/2009 Okabe ................ F16D 48/064
318/647
2010/0013419 A1 1/2010 White

FOREIGN PATENT DOCUMENTS

| DE | 202 14 764 U1 | 11/2002 |
|---|---|---|
| EP | 0 817 366 A2 | 1/1998 |
| EP | 2 953 260 A1 | 12/2015 |
| JP | 2-131396 A | 5/1990 |

OTHER PUBLICATIONS

International Search Report (PCT/ISA/210) issued in PCT Application No. PCT/EP2018/080689 dated Mar. 26, 2019 with English translation (five pages).

German-language Written Opinion (PCT/ISA/237) issued in PCT Application No. PCT/EP2018/080689 dated Mar. 26, 2019 (five pages).

* cited by examiner

ELECTRONICS HAVING ONE OR MORE OUTPUT-STAGE UNITS FOR THE OPERATION OF TWO OR MORE MOTOR UNITS

BACKGROUND AND SUMMARY OF THE INVENTION

The present invention relates to an apparatus for operating two or more motor units.

In systems having multiple electric motors or in the case of one electric motor in which the coils are interconnected in such a manner that they may be controlled in the same manner as two separate electric motors (two motor units), typically one output stage unit is provided per electric motor or per motor unit in order to control the electric motor. This creates high production costs and an increased requirement for space.

However, there are systems in which during normal operation not all the electric motors or all the motor units are simultaneously in operation. For example, during electromotive shift path selection and gear selection/shifting where an electric motor is provided for the shift path selection and a further electric motor is provided for the gear selection. During normal operation, the two electric motors are not brought into operation simultaneously since it is always necessary to initially select the correct shift path before the gear selection may be performed. Or, in systems having direct current motors, for example in a transmission actuator in which one output stage unit (normally of two or four transistors) is provided per motor in order to control the motor; in this case it is likewise possible that not all the motors are brought into operation simultaneously in the transmission actuator. Or for example in the case of steering arrangements, wherein for redundancy reasons or other reasons twice the number of required windings is provided; a set of a number of required windings is considered to be a motor unit, this means then that the system comprises two motor units that during normal operation are not brought into operation simultaneously. In a similar manner, such examples are also found in the case of a quadcopter or a machine tool, where likewise multiple motors/motor units are installed but during normal operation are not brought into operation simultaneously.

The object of the invention is therefore to provide an apparatus that renders it possible in a cost-effective and space-saving manner to use at least two or more motors or one motor in which the coils are interconnected in such a manner that they may be controlled in the same manner as two separate electric motors.

In accordance with the invention, the solution to the object resides in an apparatus including a switching unit that entirely or in part switches an output stage unit from a motor unit, which is currently not in operation, to another motor unit, which is currently in operation, in order to supply the other motor unit. Moreover, this apparatus comprises a control unit that may control one or more suitable output stage units for the required loading condition of the motor units.

In the following, it should apply that it is possible for the motor units to be both multiple separate motors and a single motor having a construction of multiple coils that are interconnected in such a manner that they may be controlled in the same manner as two separate electric motors. The invention may be used both on electrically commutated motors and on mechanically commutated direct current motors.

By virtue of the fact that a switching unit may be entirely or in part switched using the one output stage unit, which is not required, from one motor unit to another motor unit in order to control the other motor unit, the number of output stage units may be reduced in the system and the costs may be accordingly saved. The requirement for space is also smaller since the space for the output stage unit that is omitted is also not required.

Such an apparatus in accordance with the invention may be used for example on electromotive transmissions or clutch actuators or for the control of brushless motors in order to generate an output stage unit of the rotating field. In the case that the apparatus in accordance with the invention comprises multiple output stage units, the output stage units may comprise different performance classes.

Two exemplary embodiments of the invention are further explained below with the aid of the figures.

DETAILED DESCRIPTION OF THE DRAWINGS

Figure 1:
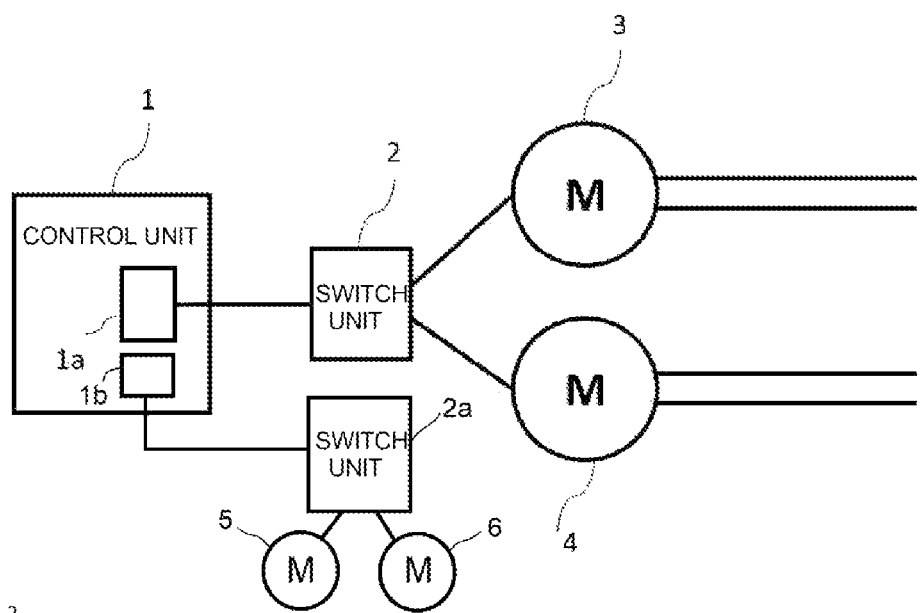
FIG. 1 illustrates an apparatus in accordance with an embodiment of the invention for two electric motors that are arranged in parallel.

FIG. 1 illustrates a system having two electric motors 3, 4, wherein the two electric motors 3 and 4 are arranged in parallel and the system is designed in such a manner that during normal operation, the two electric motors do not operate simultaneously. The apparatus comprises a control unit 1 having a single output stage unit 1a, and also a switching unit 2, wherein the control unit 1 is embodied so as to control the output stage unit 1a and to make the output stage unit available to the electric motors 3, 4. In this case, the switching unit 2 is embodied in such a manner that the output stage unit 1a is either allocated to the electric motor 3 or the electric motor 4 depending upon which of these electric motors is currently in operation.

Figure 2:
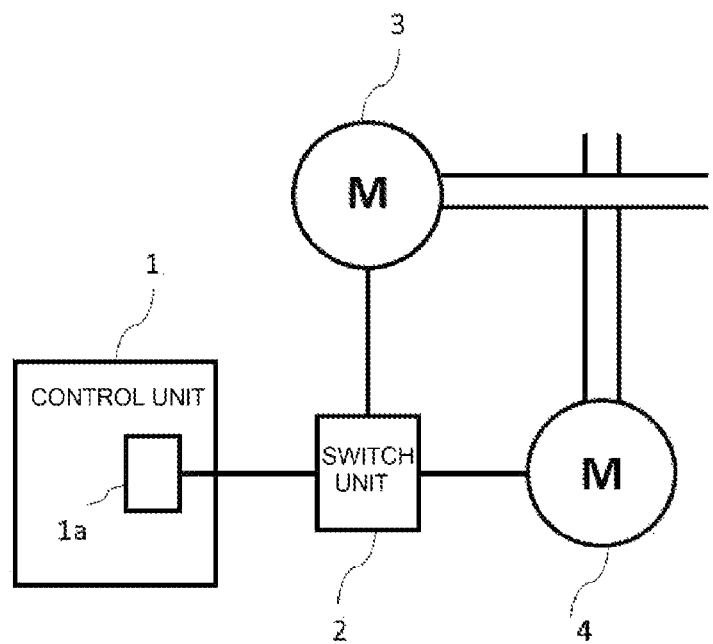
FIG. 2 illustrates an apparatus in accordance with an embodiment of the invention for two electric motors in a shift path selecting apparatus and gear selecting apparatus.

FIG. 2 illustrates an apparatus in accordance with another embodiment having two electric motors 3, 4, wherein the two electric motors 3 and 4 are located in a shift path selecting apparatus and gear selecting apparatus. In this case, the motors are arranged in such a manner that the drive shafts intersect at a 90° angle since one drive shaft is responsible for the shift path selection, while the other drive shaft is responsible for the gear selection. In this case, the system is likewise designed in such a manner that in normal operation, the electric motors do not operate simultaneously. The apparatus likewise comprises a control unit 1 having a single output stage unit 1a and also a switching unit 2, wherein the control unit 1 is designed so as to control the output stage unit 1a and to make the output stage unit available to the electric motors 3, 4. In this case, the switching unit 2 is embodied in such a manner that the output stage unit 1a is either allocated to the electric motor 3 or to the electric motor 4 depending upon which of these electric motors is currently in operation.

Such an apparatus in accordance with the invention may be scaled arbitrarily according to requirement depending upon the principle as is illustrated in the above exemplary embodiments so long as the number of output stage units is less than the number of motor units, in other words the apparatus may also control multiple output stage units in order to make the suitable output stage units available to the motor units that are currently to be brought into operation in a system having more than two motor units. An example of such an arrangement is shown in FIG. 1, in which a second output stage unit 1b supplies its output to an another switching unit 2a to control motors 5, 6.

LIST OF REFERENCE NUMERALS

1 Control unit
1a, 1b Output stage unit
2, 2a Switching unit
3, 4, 5, 6 Electric motor

What is claimed is:
1. A shift path and gear selecting system, comprising:
 a first motor unit with a first drive shaft configured to drive a shift path selection;
 a second motor unit with a second drive shaft configured to drive a gear selection;
 an output stage unit, by which the first and second motor units are operated;
 a switching unit configured so as to switch the output stage unit between the first and second motor units,
 wherein
  the system has more motor units than output stage units,
  the motors are arranged such that the first and second drive shafts cross at a 90° angle,
  and
  the system is configured such that the first and second motor units are not operable to drive simultaneous shift path selection and gear selection.
2. The shift and gear path selecting system as claimed in claim 1, further comprising:
 a control unit configured to control the output stage unit.
3. The shift and gear path selecting system as claimed in claim 2, wherein the switching unit is configured to identify which of the first and second motor units is to be brought into operation and to supply the identified motor unit with the output stage unit.
4. The shift and gear path selecting system according to claim 1, wherein the control unit is configured to control multiple output stage units that are allocated to multiple motor units.
5. The shift and gear path selecting system according to claim 3, wherein the output stage units in the control unit comprise different performance classes.
6. The shift and gear path selecting system according to claim 1, further comprising one or both of an electric transmission actuator and a clutch actuator.

* * * * *